US012231839B2

(12) United States Patent
Ding et al.

(10) Patent No.: US 12,231,839 B2
(45) Date of Patent: *Feb. 18, 2025

(54) METHOD TO REDUCE H-FIELD COUPLING FOR E-NOISE AND A KIND OF NON-COAXIAL INTEGRATED EARBUDS

(71) Applicant: Google LLC, Mountain View, CA (US)

(72) Inventors: Shengyin Ding, Cupertino, CA (US); Gemin Li, Pleasanton, CA (US); Yao Ding, San Jose, CA (US); Jianmin Zhang, Los Gatos, CA (US); Guohua Sun, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,656

(22) Filed: Oct. 30, 2023

(65) Prior Publication Data

US 2024/0064453 A1 Feb. 22, 2024

Related U.S. Application Data

(63) Continuation of application No. 17/673,363, filed on Feb. 16, 2022, now Pat. No. 11,812,216.

(51) Int. Cl.
*H04R 1/10* (2006.01)
*H01F 7/02* (2006.01)

(52) U.S. Cl.
CPC ............ *H04R 1/1075* (2013.01); *H01F 7/02* (2013.01); *H04R 1/1016* (2013.01)

(58) Field of Classification Search
CPC ........ H01F 7/02; H04R 1/1075; H04R 1/1016
See application file for complete search history.

(56) References Cited

U.S. PATENT DOCUMENTS

| | | | | |
|---|---|---|---|---|
| 11,067,644 | B2 * | 7/2021 | Maguire ............ | G01R 33/0206 |
| 11,272,299 | B2 * | 3/2022 | Meskens .............. | H04R 25/602 |
| 11,812,216 | B2 | 11/2023 | Ding et al. | |
| 2009/0296947 | A1 | 12/2009 | Duron et al. | |
| 2019/0320269 | A1 | 10/2019 | Haubrich et al. | |
| 2020/0110439 | A1 | 4/2020 | Deng | |
| 2020/0300932 | A1 | 9/2020 | Maguire | |
| 2022/0217463 | A1 * | 7/2022 | Panecki ............... | H04R 1/1041 |
| 2023/0262376 | A1 | 8/2023 | Ding et al. | |

OTHER PUBLICATIONS

"Notice of Allowance", U.S. Appl. No. 17/673,363, Jul. 6, 2023, 10 pages.

* cited by examiner

*Primary Examiner* — Brian Ensey
(74) *Attorney, Agent, or Firm* — Colby Nipper PLLC

(57) ABSTRACT

The present disclosure provides for an arrangement of components within a hearable device, such as earbuds, to reduce H field coupling for E noise improvement. A battery is positioned above a magnet and speaker, such that the battery is not coaxially aligned with either the magnet or the speaker. An internal positive tab of a battery is positioned farthest from a speaker yoke, while an internal negative tab of the battery is closer to the speaker yoke. Magnetic flux poles of a contact magnet have different contributions for electric field coupling.

20 Claims, 7 Drawing Sheets

METHOD TO REDUCE H-FIELD COUPLING FOR E-NOISE AND A KIND OF NON-COAXIAL INTEGRATED EARBUDS

RELATED APPLICATION

This application is a continuation of and claims priority to U.S. patent application Ser. No. 17/673,363, filed on Feb. 16, 2022, the disclosure of which is incorporated by reference herein in its entirety.

BACKGROUND

As popularity of fully wireless earbuds increases on the global market, earbuds makers are investigating new productions to be smaller, lighter, cheaper, and more comfortable, while also having good quality, such as good noise canceling performance, etc. In-ear hearable devices such as earbuds often have a lower noise floor as compared to other on-body or non-wearable devices, making any annoying noise more problematic for in-ear devices as compared to other devices. Electronic noise, sometimes referred to as "E noise," can be problematic for users playing music under a quiet environment.

Because earbuds are typically small form factor devices, interior space within the earbud housing is limited. Positioning components closely together within such tight space constraints often causes H field coupling, created by magnetic and electric fields. Existing solutions for reducing the H field coupling for E noise include utilizing larger earbud housings with more internal space such that a contact magnet can be positioned far away from a speaker module and battery. Other solutions include using a magnet with lower magnetic flux force, or adding H field absorption shielding above the speaker module. However, these solutions may have unintended effects of reduced quality or reduced user experience.

BRIEF SUMMARY

The present disclosure provides an earbud wherein a battery, contact magnet, and speaker are packaged with different locations of internal positive and negative poles to reduce H field coupling and E noise. The internal positive of the battery may be positioned between a center of speaker module and a position approximately 180 degrees from a center line of the speaker, and above a center of the contact magnet. The internal negative of the battery may be positioned above a center of the speaker yoke. Such configuration provides for saving space with better E noise performance.

One aspect of the disclosure provides a hearable device, comprising a housing, a battery within the housing, the battery having an internal positive tab and an internal negative tab, a contact magnet within the housing, the contact magnet positioned beneath the internal positive tab of the battery, and a speaker within the housing and positioned beneath the internal negative tab of the battery.

The speaker may include a yoke having a North pole and a South pole, the South pole being oriented adjacent a bottom surface of the battery. The contact magnet may also have a North pole and a South pole, the North pole being oriented adjacent a bottom surface of the battery. The contact magnet may have any of a variety of shapes, such as a triangular cross section. According to some examples, the contact magnet may be positioned laterally adjacent to the speaker.

The hearable device may be an earbud or other device.

According to some examples, a central axis through the battery is separated from a central axis through the speaker by a lateral distance d, the distance d being greater than 0. For example, the distance d may be less than or equal to half a diameter of the battery.

Another aspect of the disclosure provides a hearable device, comprising a housing, a battery within the housing, the battery having a top surface and a bottom surface, a contact magnet within the housing, the contact magnet positioned beneath the battery, the contact magnet having a North pole and a South pole, the contact magnet being oriented such that the North pole is adjacent the bottom surface of the battery, and a speaker within the housing and positioned beneath the battery, the speaker comprising a yoke having a North pole and a South pole, the yoke oriented such that a South pole of the yoke is adjacent the bottom surface of the battery.

The battery has an internal positive tab and an internal negative tab. The internal negative tab may be oriented above the speaker yoke, and the internal positive tab may be oriented above the contact magnet. According to some examples, the internal positive tab is positioned at least a predetermined distance from the speaker yoke. The internal negative tab of the battery may be positioned closer to the speaker yoke than the internal positive tab of the battery.

Another aspect of the disclosure provides a hearable device, comprising a housing, a battery within the housing, the battery having a central battery axis, a contact magnet within the housing, the contact magnet positioned beneath the battery, and a speaker within the housing positioned beneath the battery, the speaker having a central speaker axis, wherein the central battery axis is separated from the central speaker axis by at least a predetermined distance d.

The battery has an internal positive tab and an internal negative tab. The speaker comprises a speaker yoke and the internal negative tab may be oriented above the speaker yoke. In some examples, the internal positive tab is oriented above the contact magnet.

According to some examples, the contact magnet may have a North pole, the speaker may have a speaker yoke having a North pole and a South pole, and the North pole of the contact magnet may be positioned adjacent the battery beneath the internal positive tab, and the South pole of the speaker yoke may be positioned adjacent the battery beneath the internal negative tab. The contact magnet may have a triangular or other shape cross section.

BRIEF DESCRIPTION OF THE DRAWINGS

Example implementations of the present disclosure are described in, but not limited by, the following drawings. Like references may indicate similar elements.

DETAILED DESCRIPTION

The present disclosure provides a system and method to reduce H-field coupling for E-noise, including arranging positioning among an internal positive tab of a battery, an internal negative tab of the battery, a contact magnet, and a speaker module. The arrangement allows for close positioning of such components within small form factor devices, such as earbuds, with reduced H-field coupling and reduced E-noise.

The battery in hearable devices is the energy source, supplying power to other components such as a microphone, speaker, microprocessor, etc. Ripple current on the battery has a strong E field, and when coupled with a contact magnet and speaker yoke contributes to the H field coupling. The battery has an internal positive tab and an internal negative tab. Positioning of the battery with respect to the internal tab locations can impact H field coupling, and the different locations of internal tabs of the battery cause different E noise levels.

Figure 1A:
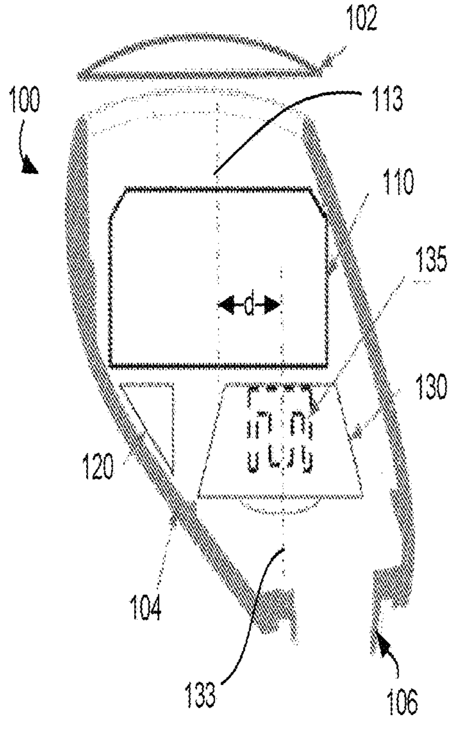
FIGS. 1A-C illustrate a front cross-sectional view, a side cross-sectional view, and a top view, respectively, of an example hearable device according to aspects of the disclosures.
Figure 1B:
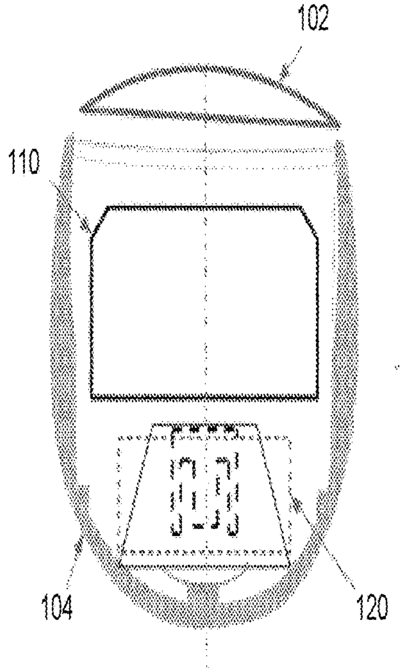
Figure 1C:
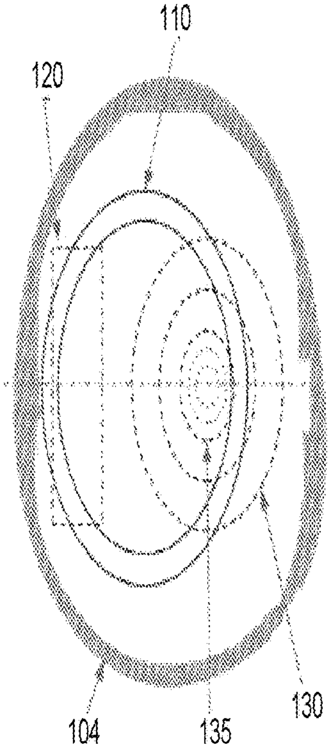

FIGS. 1A-C illustrate cross-sectional front, side, and top views of a wireless earbud 100. The earbud 100 may be, for example, a fully wireless earbud capable of communication with other devices via short range wireless pairing or other protocols. While the present examples relate to earbuds, it should be understood that the arrangement of internal components described below may be applied in other hearable devices, such as smart glasses, augmented or virtual reality headsets, over-ear headphones, hearing aids, etc.

The earbud 100 illustrated in the present example includes a top cover 102 and a housing 104 that encase a number of components, such as battery 110, contact magnet 120, and speaker 130. While several components within the earbud 100 are illustrated, it should be understood that a number of other components may also be present within the earbud 100, such as an antenna, microprocessor, etc. The housing 104 may be made of any of a variety of materials, such as plastic, metal, fiberglass, etc., and make have any of a variety of shapes. For example, the cross-section of the housing 104 shown in FIG. 1A appears wider near the top cover 102 and narrower near a bottom portion 106 that is laterally offset from the top portion. However, in other examples, the housing may have a same relative width throughout, may have different relative widths between a top portion and a bottom portion, and/or may have different degrees of relative alignment/offset between top and bottom portion.

The battery 110 is positioned above the speaker 130, such that the two components are noncoaxial. For example, a battery central axis 113 extending through the battery 110 and a speaker central axis 133 extending through the speaker 130 and speaker yoke 135 may be separated by a distance d. The distance d can be, for example, a few millimeters or potentially more as space allows within the housing 104. According to some examples, the distance d separating the battery central axis 113 from the speaker central axis 133 can be anywhere from 0-approximately ½ a diameter of the battery 110.

The magnet 120 is positioned beneath the battery 110 and laterally adjacent to the speaker 130, in a space created by the lateral offset of the speaker 130 with respect to the battery 110. As illustrated in the example of FIG. 1A, the magnet 120 has a triangular cross section. In other examples, the magnet 120 may have any of a variety of different shapes and sizes, including different cross-sectional shapes. As described further below in connection with FIGS. 2-4, the magnet 120 may be oriented such that poles of the magnet 120 and speaker yoke 135 and internal battery tabs of the battery 110 create a reduced H field coupling as compared with conventional component orientations.

Figures 2A, 2B, 2C:
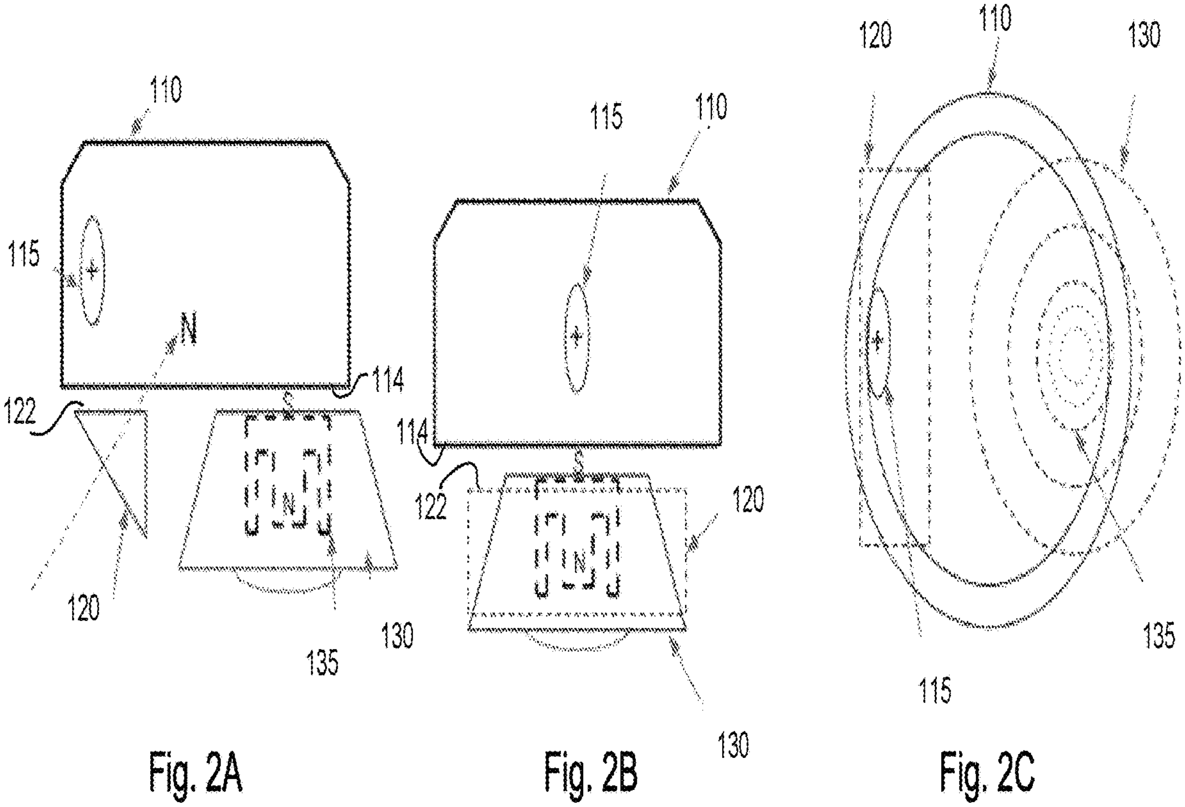
FIGS. 2A-C illustrate a front view, side view, and top view, respectively, of components packaged within a hearable device according to one example.

FIGS. 2A-C illustrate front, side, and top views of the components of FIG. 1, with identification of the positive internal battery tabs and North and South poles of the magnet 120 and speaker yoke 135. In this example, positive internal battery tab 115 is positioned above the magnet 120. The magnet 120 is oriented such that its North pole is directed towards the battery 110. For example, a top surface 122 of the magnet 120 may be its North pole, and may be positioned adjacent a bottom surface 114 of the battery 110.

The speaker yoke 135 may also have North and South poles. In the example shown, the speaker yoke 135 is oriented such that its North pole is closer to the magnet 110 than the South pole. For example, a top surface of the yoke 135 may be it's South pole, and may be positioned adjacent the bottom surface 114 of the battery 110.

As seen in the front view diagram of FIG. 2A, the internal positive tab 115 of the battery 110 is positioned above the contact magnet 120. The battery 110 is positioned such that it is not coaxially aligned with either the magnet or the speaker. An internal positive tab of a battery 110 is positioned farthest from the speaker yoke 135, while an internal negative tab of the battery 110 is closer to the speaker yoke 135. When viewed from the side view in FIG. 2B, the internal positive battery tab 115 appears approximately along a centerline of the battery 110, as are contact magnet 120, speaker 130, and yoke 135. When viewed from the top view of FIG. 2C, the internal positive battery tab 115 appears to a left of the speaker 130.

Figure 3A:
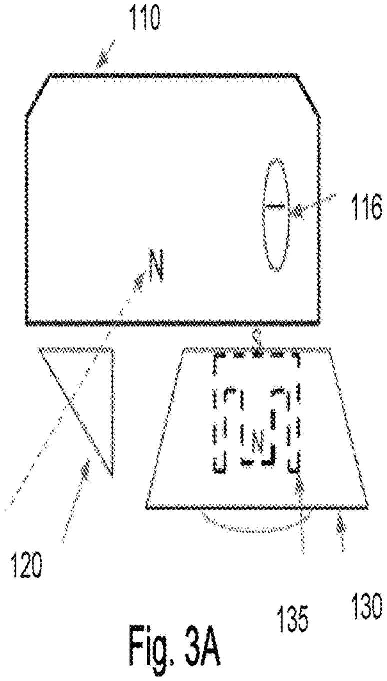
FIGS. 3A-C illustrate a front view, side view, and top view, respectively, of components packaged within a hearable device according to another example.
Figure 3B:
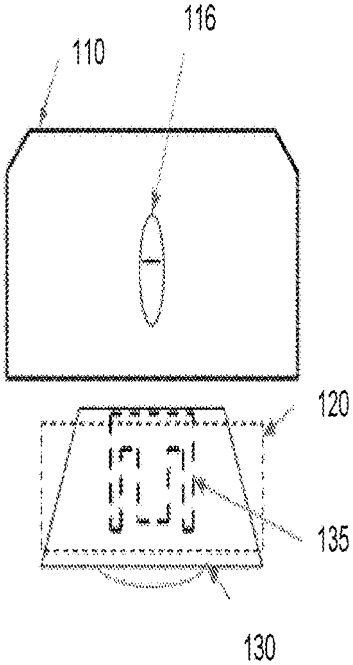
Figure 3C:
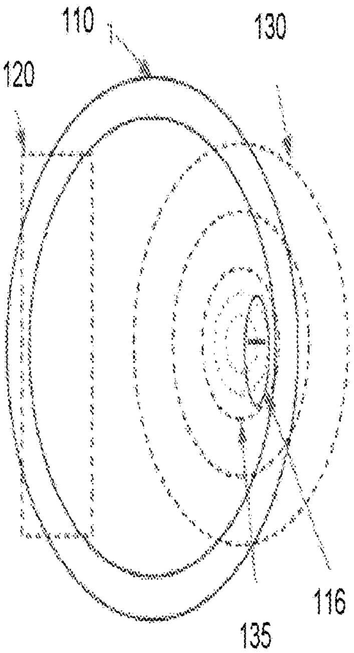

FIGS. 3A-C illustrate the same configuration of FIGS. 2A-C, but indicate an internal negative battery tab 116 as opposed to the internal positive battery tab 115. The internal negative battery tab 116 is positioned above the speaker 130 and yoke 135. The orientations of the magnet 120 and speaker yoke 135 remain the same as FIGS. 2A-C. The North pole of the magnet 120 is adjacent the battery 110, and the South pole of the yoke 135 is adjacent the battery 110. As seen in the side view diagram of FIG. 3B, the internal negative battery tab 116 is approximately on a centerline of the battery 110, and the contact magnet 120 and speaker 130 and yoke 135 are approximately on the same centerline. As seen in the top view of FIG. 3C, the internal negative battery tab 116 is positioned above the yoke 135 of the speaker 130.

Figure 4A:
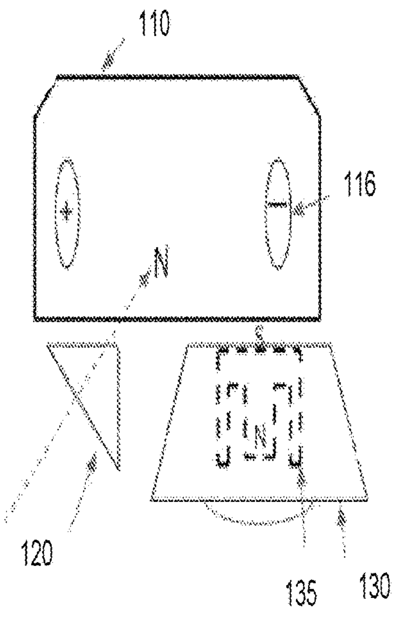
FIGS. 4A-C illustrate a front view, side view, and top view, respectively, of components packaged within a hearable device according to another example.
Figure 4B:
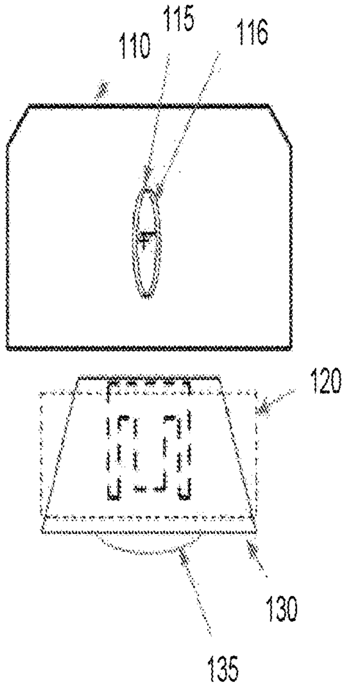
Figure 4C:
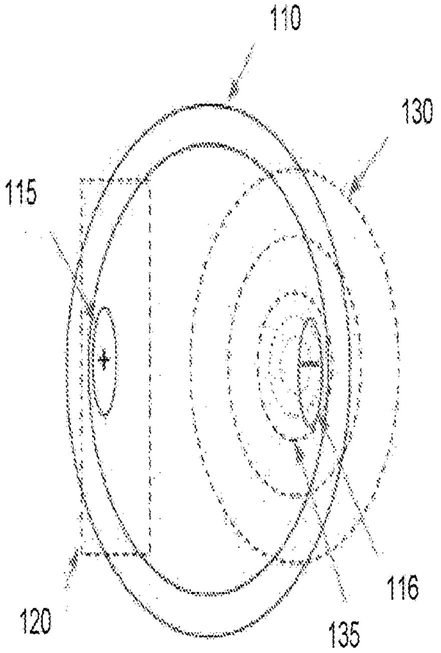

FIGS. 4A-C illustrate the same configurations as FIGS. 2A-C and 3A-C, and indicate both the internal positive battery tab 115 and the internal negative battery tab 116. As shown, the bottom surface 114 of the battery 110 extends above the entire speaker yoke 135. As best seen in FIG. 4C, the battery 110 extends above most of the magnet 120 and the speaker 130. In other examples, the battery 110 may extend above greater or lesser portions of the magnet 120 and/or the speaker 130. For example, in some implementations the relative sizes, shapes, and configurations of the battery 110, magnet 120, and speaker 130 may be such that the battery 110 extends over an entire outer perimeter of the magnet 120 and/or the speaker 130. The internal negative battery tab 116 is positioned above the yoke 135 and the internal positive battery tab 115 is positioned above the contact magnet 120. The North pole of contact magnet 120 is positioned adjacent the bottom surface 114 of the battery 110. The South pole of the yoke 135 is positioned adjacent the bottom surface 114 of the battery 110.

As seen from the side view diagram of FIG. 4B, the internal negative tab 6 and internal positive tab 5 of battery 120 are aligned along a centerline. The yoke 135, speaker 130, and magnet 120 are also aligned along a centerline when viewed from the side view. As seen in the top view of FIG. 4C, the internal negative tab 116 of battery 120 is on the right side of battery 120, above the yoke 135 of speaker 130. The internal positive tab 115 of battery 120 is on the left side of battery 120, above the contact magnet 120.

Figure 5A:
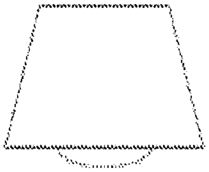
FIGS. 5A-C illustrate a front, side, and top view, respectively, of an example speaker according to aspects of the disclosure.
Figure 6A:
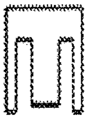
FIGS. 6A-C illustrate a front, side, and top view, respectively, of an example speaker yoke according to aspects of the disclosure.
Figure 7A:
FIGS. 7A-C illustrate a front, side, and top view, respectively, of an example contact magnet according to aspects of the disclosure.
Figure 5B:
Figure 6B:
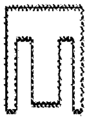
Figure 7B:
Figure 5C:
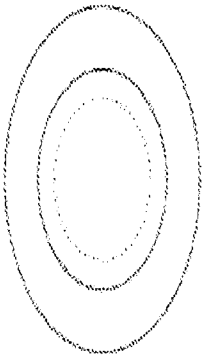
Figure 6C:
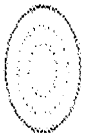
Figure 7C:

FIGS. 5A-C illustrate front, side, and top views of the speaker 130. FIGS. 6A-C illustrate front, side, and top views of the yoke 135. FIGS. 7A-C illustrate front, side, and top views of the magnet 120. While each of these components are shown as having a particular shape, it should be understood that other shapes are possible.

Figure 8:
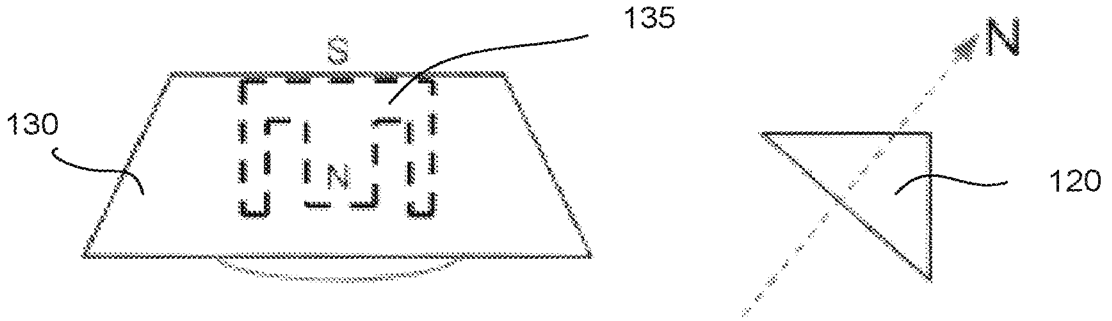
FIG. 8 shows the front view of the contact magnet with magnetic pole and the front view of the speaker with magnetic pole according to an example.

FIG. 8 illustrates an example combination of speaker yoke and magnet orientation, which is consistent with the orientation illustrated in the examples of FIGS. 2-4 above. In particular, speaker 130 includes a yoke 135, wherein a South pole of the yoke 135 is at a top of the yoke 135, and a North pole of the yoke 135 is at a bottom of the yoke 135. Correspondingly, a North pole of the magnet 120 is at a top of the magnet 120. In this regard, opposing poles of the magnet 120 and yoke 135 are oriented toward a same direction.

Figure 9:
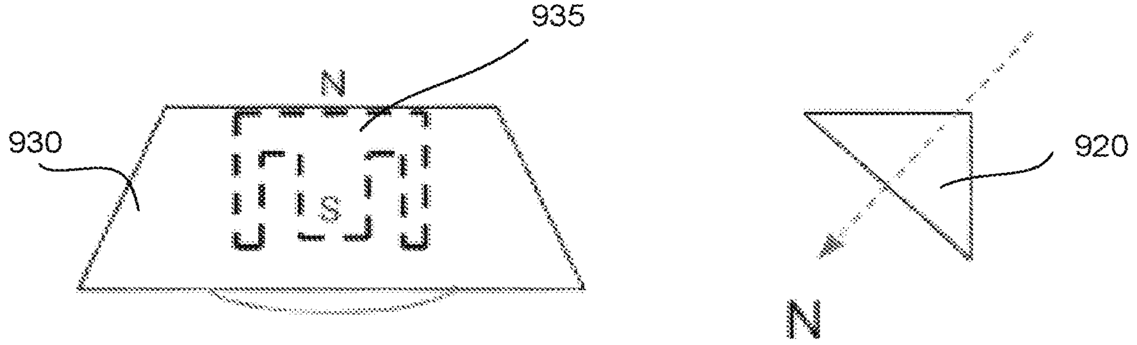
FIG. 9 shows the front view of the contact magnet with magnetic pole and the front view of the speaker with magnetic pole according to another example.

According to other examples, the arrangement of the magnet, speaker, and battery may be varied while maintaining a consistent relationship between the poles and battery tabs. For example, as shown in FIG. 9, speaker 930 includes a yoke 935 where a North pole of the yoke 935 is at a top and a South pole of the yoke 935 is at a bottom. With this arrangement, a magnet 920 may be used, wherein a North pole of the magnet 920 is directed in a downward direction. In this regard, opposing poles of the magnet 920 and yoke 935 are oriented toward a same direction, but in this example the poles and direction are reversed as compared to the example of FIG. 8. With this configuration, when positioning a battery over the speaker yoke 935 and magnet 920, the internal tabs of the battery may be reversed, such that a positive internal battery tab is positioned above the speaker yoke 935 and a negative internal battery tab is positioned above the magnet 920.

Figure 10:
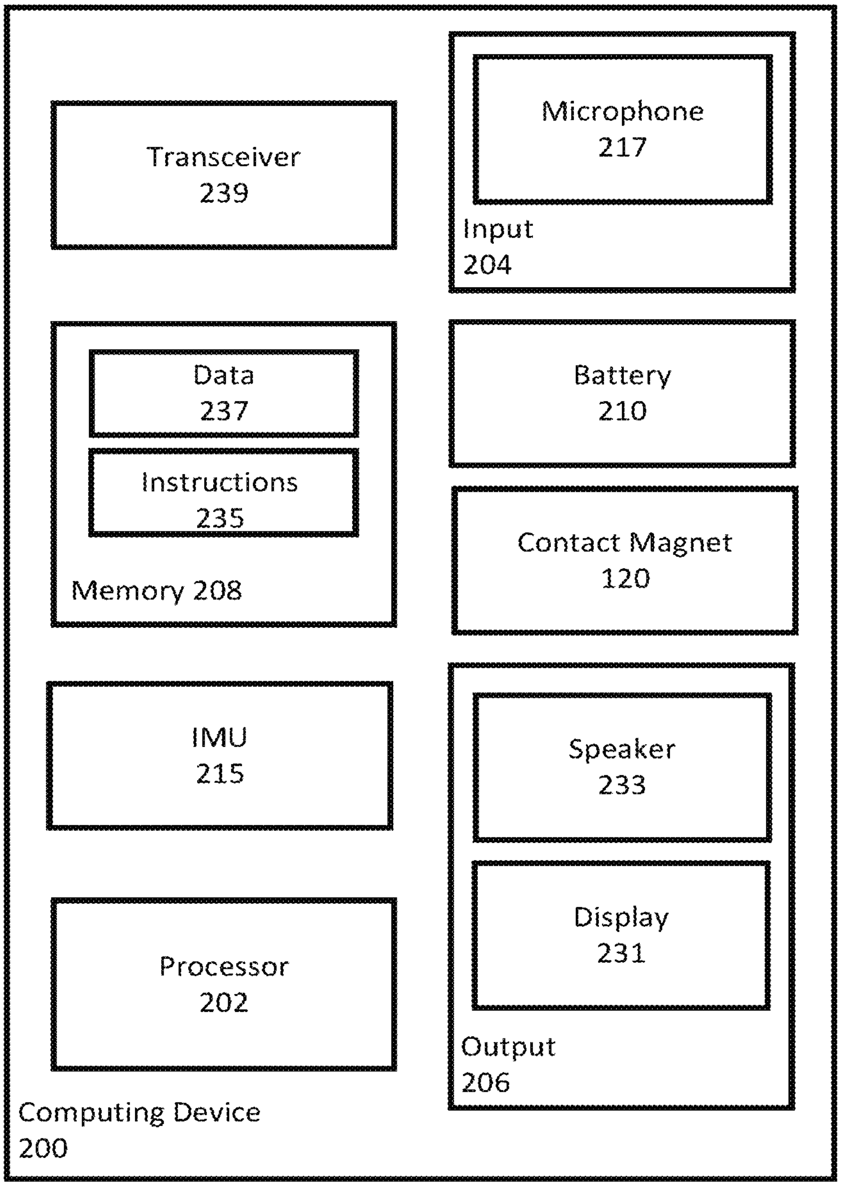
FIG. 10 shows the front view of the contact magnet with magnetic pole and the front view of the speaker with magnetic pole according to an example.

FIG. 10 illustrates a block diagram of a hearable computing device 200 implementing components according to aspects of the disclosure. The computing device 200 can include a processor 202, input 204, output 206, memory 208, a battery 210, an internal measurement unit (IMU) 215, and a transceiver 239.

The IMU 215 can include a number of sensors, for example accelerometers, gyroscopes, and magnetometers. The IMU 215 can collect measurements as one or more signals from various sensors. The measurements can characterize detected motion along different axes. In some examples, the measurement data from the IMU 215 includes linear motion data characterizing the motion of the IMU 215 along different axes, for example an x-axis, y-axis, and/or z-axis of motion.

Processor 202 may be any conventional processor, such as commercially available microprocessors. The processor 202 can include one or more central processing units (CPUs), graphic processing units (GPUs), field-programmable gate arrays (FPGAs), and/or application-specific integrated circuits (ASICs), such as tensor processing units (TPUs). Although FIG. 2 illustrates the processor 202, memory 208, and other elements of the computing device 200 as being within the same respective blocks, it will be understood by those of ordinary skill in the art that the processor or memory may actually include multiple processors or memories.

Memory 208 may store information that is accessible by the processor 202, including instructions 235 that may be executed by the processor 202, and data 237. The memory 208 can also include data 237 that can be retrieved, manipulated, or stored by the processor 202. The memory 208 may be of a type of memory operative to store information accessible by the processors 202, such as volatile or non-volatile memory, including non-transitory computer-readable media, or other media that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 235 and data 237 are stored on different types of media.

Data 237 may be retrieved, stored, or modified by the processor 202 in accordance with the instructions 235. For instance, although the present disclosure is not limited by a particular data structure, the data 237 may be stored in computer registers, in a relational database as a table having a plurality of different fields and records, stored, for example as: JSON, YAML, proto, or XML documents. The data 237 can also be formatted in a computer-readable format such as, but not limited to, binary values, ASCII or Unicode. The data 237 may also be formatted in a computer-readable format such as, but not limited to, binary values, ASCII, or Unicode. In other examples, the data 237 may be stored as bitmaps comprised of pixels that are stored in compressed or uncompressed formats.

The data 237 can be retrieved, stored, or modified by the processor(s) 202 in accordance with the instructions 235. Moreover, the data 237 may include information sufficient to identify the relevant information, such as numbers, descriptive text, proprietary codes, pointers, references to data stored in other memories (including other network locations) or information that is used by a function to calculate the relevant data.

The instructions 235 can include one or more instructions that when executed by the processor 202, causes the one or more processors to perform actions defined by the instructions. The instructions 235 can be stored in object code format for direct processing by the processor 202, or in other formats including interpretable scripts or collections of independent source code modules that are interpreted on demand or compiled in advance.

The input 204 can include any appropriate mechanism or technique for receiving input from a wearer, including the microphone 217. In some examples, wearer input can also be received from other peripherals, such as a keyboard, mouse, mechanical actuators, soft actuators, touchscreens, and sensors.

The battery 210 may be any type of small form-factor power supply for powering the components of the computing device 200. The battery 210 may supply power to the processor 202, microphone 217, IMU 215, etc. individually, such that any individual component may be powered down to preserve life of the battery 210 while other components remain powered on.

The output 206 may include, for example, a display 231, a speaker 233, or any combination of these or other outputs. According to some examples, the output 206 may provide an indication to the wearer when the microphone is powered on and receiving voice input.

The transceiver 239 may be used for communicating with other devices. For example, where the wearer is having a conversation, the transceiver 239 may be used to send the received voice of the wearer to another device and receive signals from the other device for output to the wearer through output 250.

The arrangement described in the foregoing examples provides for good E noise performance without H field absorption shielding. In addition, the configuration allows for space saving, which is beneficial for small form factor hearable devices, such as earbuds. Moreover, the solution may be produced at relatively low cost.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A hearable device, comprising:
- a housing;
- a battery within the housing, the battery having an internal positive tab and an internal negative tab;
- a contact magnet within the housing, the contact magnet positioned beneath the internal negative tab of the battery; and
- a speaker within the housing and positioned beneath the internal positive tab of the battery.

2. The hearable device of claim 1, wherein the speaker comprises a yoke having a North pole and a South pole, the North pole being oriented adjacent a bottom surface of the battery.

3. The hearable device of claim 1, the contact magnet having a North pole and a South pole, the South pole being oriented adjacent a bottom surface of the battery.

4. The hearable device of claim 1, wherein the contact magnet has a triangular cross section.

5. The hearable device of claim 1, wherein the contact magnet is laterally adjacent to the speaker.

6. The hearable device of claim 1, wherein the hearable device is an earbud.

7. The hearable device of claim 1, wherein a central axis through the battery is separated from a central axis through the speaker by a lateral distance d, the distance d being greater than 0.

8. The hearable device of claim 7, wherein the distance d is less than or equal to half a diameter of the battery.

9. A hearable device, comprising:
- a housing;
- a battery within the housing, the battery having a top surface and a bottom surface;
- a contact magnet within the housing, the contact magnet positioned beneath the battery, the contact magnet having a North pole and a South pole, the contact magnet being oriented such that the South pole is adjacent the bottom surface of the battery; and
- a speaker within the housing and positioned beneath the battery, the speaker comprising a yoke having a North pole and a South pole, the yoke oriented such that a North pole of the yoke is adjacent the bottom surface of the battery.

10. The hearable device of claim 9, wherein the battery has an internal positive tab and an internal negative tab.

11. The hearable device of claim 9, wherein the internal positive tab is oriented above the speaker yoke.

12. The hearable device of claim 9, wherein the internal negative tab is oriented above the contact magnet.

13. The hearable device of claim 9, wherein the internal negative tab is positioned at least a predetermined distance from the speaker yoke.

14. The hearable device of claim 9, wherein the internal positive tab of the battery is positioned closer to the speaker yoke than the internal negative tab of the battery.

15. A hearable device, comprising:
- a housing;
- a battery within the housing, the battery having a central battery axis;
- a contact magnet within the housing, the contact magnet positioned beneath the battery; and
- a speaker within the housing positioned laterally adjacent to the contact magnet, the speaker having a central speaker axis;
- wherein the central battery axis is separated from the central speaker axis by at least a predetermined distance d.

16. The hearable device of claim 15, wherein the battery has an internal positive tab and an internal negative tab.

17. The hearable device of claim 16, wherein the speaker comprises a speaker yoke and wherein the internal positive tab is oriented above the speaker yoke.

18. The hearable device of claim 16, wherein the internal negative tab is oriented above the contact magnet.

19. The hearable device of claim 16, wherein:
- the contact magnet has a South pole;
- the speaker comprises a speaker yoke having a North pole and a South pole; and
- the South pole of the contact magnet is positioned adjacent the battery beneath the internal negative tab, and the North pole of the speaker yoke is positioned adjacent the battery beneath the internal positive tab.

20. The hearable device of claim 15, wherein the contact magnet has a triangular cross section.

* * * * *